United States Patent [19]

Ohe

[11] 4,400,938
[45] Aug. 30, 1983

[54] HYDRAULIC FLUID FEEDING DEVICE FOR POWER STEERING DEVICE

[75] Inventor: Takeshi Ohe, Higashimatsuyama, Japan

[73] Assignee: Jidosha Kiki Co., Ltd., Tokyo, Japan

[21] Appl. No.: 238,527

[22] Filed: Feb. 26, 1981

[30] Foreign Application Priority Data

Mar. 3, 1980 [JP] Japan .................................. 55-26300

[51] Int. Cl.³ .............................................. F15B 13/09
[52] U.S. Cl. ........................................ 60/429; 60/430;
60/468; 60/486; 91/24; 91/31; 137/117;
180/132
[58] Field of Search .................. 60/429, 430, 462, 468,
60/486; 91/24, 31; 180/132; 137/117

[56] References Cited

U.S. PATENT DOCUMENTS

| Re. 24,892 | 10/1960 | Banker | 137/117 |
|---|---|---|---|
| 2,837,107 | 6/1958 | Rockwell | 60/462 |
| 2,846,848 | 8/1958 | Coker | 60/429 |
| 2,898,737 | 8/1959 | Rockwell | 60/430 |
| 3,091,929 | 6/1963 | Hipp | 60/430 |
| 3,154,921 | 11/1964 | Junck | 60/429 |
| 3,426,785 | 2/1969 | Brady et al. | 137/117 |
| 3,540,218 | 11/1970 | Finn, Jr. | 60/430 |
| 3,952,510 | 4/1976 | Peterson | 60/429 |

Primary Examiner—George L. Walton
Attorney, Agent, or Firm—Flynn, Thiel, Boutell & Tanis

[57] ABSTRACT

A hydraulic fluid feeding device for a power steering device is proposed which has a plurality of pumps for feeding hydraulic fluid to the power steering device and a flow path change-over valve for switching the paths between the pumps and the power steering device, wherein the feeding rate of the hydraulic fluid to the power steering device is controlled by the action of the flow path change-over valve. The flow path change-over valve is operated according to the magnitude of the load exerted on the power steering device so that hydraulic fluid from all the pumps combined is fed to the power steering device when the load is great, and the hydraulic fluid from at least one of the pumps is fed to the power steering device when the load is small. With this device, the control of the feeding rate becomes efficient. It also becomes possible to bypass the hydraulic fluid from some of the pumps to a tank, independently of the delivery rates of the pumps, so that the power consumption may be reduced.

11 Claims, 4 Drawing Figures

HYDRAULIC FLUID FEEDING DEVICE FOR POWER STEERING DEVICE

BACKGROUND OF THE INVENTION

The present invention relates to a hydraulic fluid feeding device for feeding hydraulic fluid to operate a power steering device.

A device has been proposed which utilizes two pumps and a flow change-over valve for, on the one hand, combining the flows from the two pumps to supply them to a power steering device when the delivery rate of each pump is small, and, on the other hand, for switching the flow change-over valve to feed the hydraulic fluid from one pump to the power steering device and to bypass the hydraulic fluid from the other pump to a tank when the delivery rate of each pump becomes large. With such a device, the horsepower requirement to drive one pump may be made extremely small when bypassing the hydraulic fluid from this pump to the tank, and a lower consumption of power may be attained.

However, the power steering device requires a relatively high feeding rate of hydraulic fluid when a high load is exerted thereon, that is, when a high output is required. The device proposed above does not necessarily satisfy this requirement of the power steering device. For example, the pumps are normally driven by the engine, and their delivery rates are increased in proportion to an increase in the rotational frequency. Therefore, when a vehicle is travelling along a winding and steep slope, the flow change-over valve is so switched that the hydraulic fluid from only one pump is fed to the power steering device. Under such conditions, the feeding rate of hydraulic fluid fed to the power steering device may become too small upon abrupt turning of the steering wheel, in the clockwise or counterclockwise direction, adversely affecting the steering response.

BRIEF SUMMARY OF THE INVENTION

It is, therefore, the primary object of the present invention to provide a hydraulic fluid feeding device which is capable of attaining a lower consumption of power, and of feeding hydraulic fluid at a high rate when a high load is exerted on the power steering device. In order to achieve this object, the present invention provides a hydraulic fluid feeding device for a power steering device wherein a plurality of pumps and a flow change-over valve for switching the flow paths between these pumps and the power steering device are operated according to the magnitude of the load of the power steering device, so that the hydraulic fluid from all the pumps combined may be fed when the load is high.

It is another object of the present invention to provide a hydraulic fluid feeding device for a power steering device wherein the steering wheel and the flow change-over valve are operated in cooperation with each other, so that the hydraulic fluid from all the pumps combined may be fed to the power steering device when the steering angle of the steering handle is large, and the feeding rate of hydraulic fluid fed under a high load may be increased without failure.

It is another object of the present invention to provide a hydraulic fluid feeding device for a power steering device wherein the flow change-over valve is operated according to an increase in the pressure of hydraulic fluid fed upon operation of the power steering device, thus simplifying the construction of the overall device.

The above and other objects and features of the present invention will become apparent from the following description when taken in conjunction with the attached drawings.

BRIEF DESCRIPTION OF THE DRAWINGS

The attached drawings show the preferred embodiments of the present invention in which.

DESCRIPTION OF THE PREFERRED EMBODIMENTS

Figure 1:
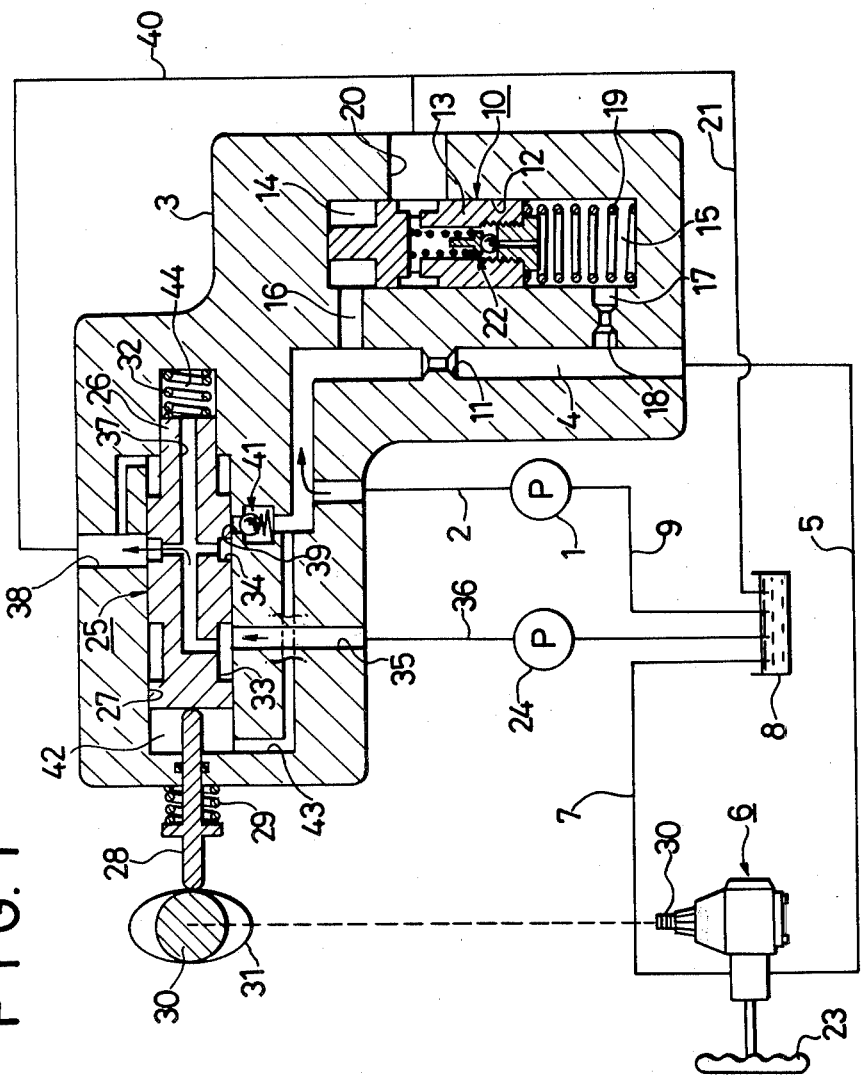
FIG. 1 is a sectional view illustrating the main part of an embodiment of the present invention.

The present invention will now be described by way of its example with reference to the accompanying drawings. Referring to FIG. 1, the hydraulic fluid delivered from a first pump 1 is fed through a conduit 2, a feeding path 4 formed in a casing 3, and a conduit 5 to a power steering device 6. The hydraulic fluid is then returned through a conduit 7 to a tank 8 and through a conduit 9 to the first pump 1. A known flow rate control valve 10 is assembled in the casing 3. This flow rate control valve 10 has an orifice 11 disposed in the feeding path 4, and a spool valve 13 slidably fitted inside a space 12 formed in the casing 3 in a fluid-tight manner. This spool valve 13 divides the space 12 into a high pressure chamber 14 and a low pressure chamber 15. The high pressure chamber 14 communicates with the upstream side of the orifice 11 through a path 16, and the low pressure chamber 15 communicates with the downstream side of the orifice 11 through a path 17 and an orifice 18 for the prevention of vibrations of the spool valve 13. The spool valve 13 is held at the nonoperative position shown in the figure by a spring 19 disposed inside the low pressure chamber 15, to normally seal the high pressure chamber 14 from a bypass 20. This bypass 20 is connected to the tank 8 through a conduit 21, and a relief valve 22 is disposed inside the spool valve 13.

According to this embodiment of the present invention, a flow path change-over valve 25, for switching the flow path of a second pump 24 according to the magnitude of the steering angle of a steering wheel 23, is disposed inside the casing 3. In order to operate the flow path change-over valve 25 according to the steering angle of the steering wheel 23, in this embodiment, one end of a rod 28 extends fluid-tightly from the exterior of the casing 3 into a hole 27 in which a spool valve 26 comprising the flow path change-over valve 25 is slidably fitted in a fluid-tight manner. The other end of this rod 28 is in elastic contact with the cam face of a cam 31 mounted on an output shaft 30 of the power steering device 6. The terminal end of the spool valve 26 is in elastic contact with one end of the rod by a spring 32. This cam 31 has a cam face such that the length of the rod 28 extending into the hole 27 may be minimized when the steering wheel 23 is in the neutral position, that is, when the output shaft 30 operating in cooperation therewith is in the neutral position. Further, this cam face is designed such that the length of the rod 28 extending into the hole 27 may be increased with an increase in the rotation of the output shaft, that is, an increase in the steering angle of the steering wheel 23 when the steering wheel 23 is pivoted clockwise or counterclockwise and the output shaft is correspondingly pivoted. Accordingly, the spool valve 26 is displaced to the right with the increase in the steering angle from the neutral position of the steering wheel 23 so as to switch the flow path in a manner to be described later.

Two annular grooves 33 and 34 are formed in the outer circumferential surface of the spool valve 26. One annular groove 33 constantly communicates with the outlet port of the second pump 24 through a path 35 formed in the casing 3 and a conduit 36 connected to the path 35. The other annular groove 34 constantly communicates with the annular groove 33 through a path 37 formed in the interior of the spool valve 26, and is capable of communicating with two paths 38 and 39 formed in the casing 3, according to the operating position of the spool valve 26. One path 38 communicates with the annular groove 34 when the spool valve 26 is located at the nonoperative position shown in the figure (the extreme left end), as well as with the tank 8 through a conduit 40. The other path 39 communicates with the annular groove 34 when the spool valve 26 has been slightly displaced to the right from the nonoperative position shown in the figure. The path 39 is capable of maintaining this communication with the annular groove 34 even when the spool valve 26 is further displaced to the right and the communication of the path 38 with the annular groove 34 is blocked. This path 39 also communicates with the feeding path 4 and with the outlet port of the first pump 1. A check valve 41 is disposed inside the path 39, for allowing the hydraulic fluid to flow from the side of the annular groove 34 to the side of the feeding path 4. The delivery pressure of the first pump 1 is introduced to a left end chamber 42 of the spool valve 26 through a path 43, and the delivery pressure of the second pump 24 is introduced to a right end chamber 44 through a path 37. The area receiving the pressure at the left end is set to be larger than that at the right of the spool valve 26.

With such a construction, under the condition that the steering wheel 23 is located at the neutral position, the output shaft 30 operating in cooperation therewith is also located at the neutral position, and the spool valve 26 is located at the nonoperative position, the annular groove 34 is blocked from the path 39 so that the hydraulic fluid from the second pump 24 is bypassed through the conduit 36, the path 35, the annular groove 33, the path 37, the annular groove 34, the path 38 and the conduit 40 to the tank 8. On the other hand, the hydraulic fluid from the first pump 1 is fed to the power steering device 6 through the conduit 2, the feeding path 4 and the conduit 5. When the delivery rate of the first pump 1 exceeds a predetermined value, the flow control valve 10 operates in a known manner to bypass the extra fluid from the feeding path 4 through the path 16, the high pressure chamber 14, the bypass 20 and the conduit 21 to the tank 8 so that the feeding flow rate of the fluid to the power steering device may be kept substantially constant.

Figure 3:
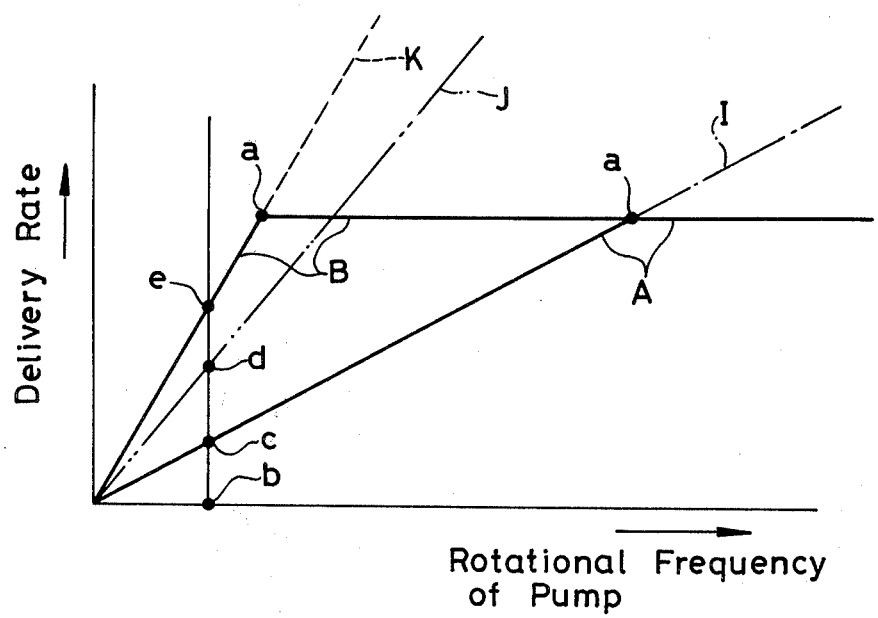
FIG. 3 shows characteristic curves representing the flow rate characteristics.

The flow rate characteristic curve (A) in FIG. 3 shows the above condition. Referring to this figure, (I) is a curve showing the relation between the rotational frequency and the delivery rate of the first pump 1, (J) is a curve showing the same relation for the second pump 24, and (K) is a curve showing the total delivery rate of the two pumps acting in combination. In the case described above, the hydraulic fluid is fed to the power steering device 6 only by the first pump 1. All the fluid delivered by the first pump 1 is fed to the power steering device until the flow rate exceeds a predetermined value (a) at which the flow rate control valve 10 starts operating. When it has exceeded the predetermined value (a), the flow rate control valve 10 operates to keep the feeding rate of the hydraulic fluid to the power steering device 6 substantially constant (the characteristic curve (A) shown in FIG. 3).

As may be seen from the above description, with a small steering angle, according to which the steering wheel 23 is located at the neutral position or is only slightly rotated clockwise or counterclockwise from the neutral position, the delivery rates of the pumps 1 and 2 do not change and the hydraulic fluid from the second pump 24 is bypassed to the tank. When the steering angle of the steering wheel 23 is zero or small, a high load is not generally exerted on the power steering device 6, so that only the hydraulic fluid from the first pump 1 may be fed to the power steering device 6. However, when a high load is exerted, the delivery pressure of the first pump 1, and accordingly, the pressure inside the chamber 42 communicating therewith, is raised. Then, the spool valve 26 is displaced to the right by the differential pressure between the chambers 42 and 44. In a manner similar to that described with reference to the case wherein the spool valve is displaced to the right, the hydraulic fluid from the second pump 24 is fed to the power steering device 6.

Figure 2:
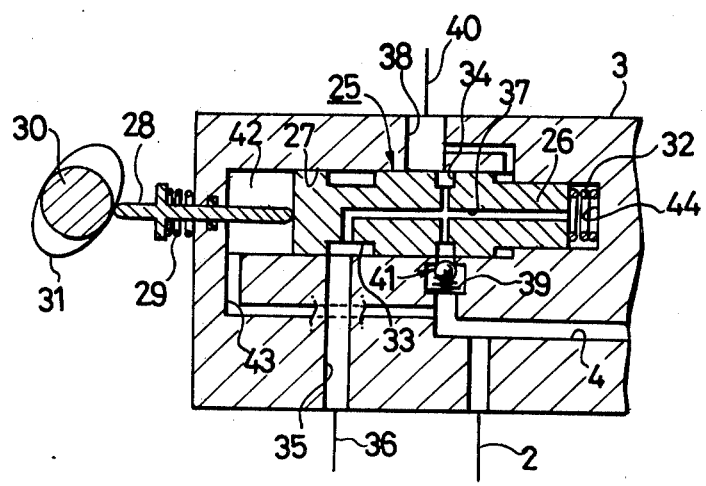
FIG. 2 is a sectional view of the main part of the device shown in FIG. 1 under a different condition.

When the steering angle of the steering wheel 23 becomes large and the displacement to the right of the spool valve 26 becomes large through the output shaft 30 operating in cooperation therewith, the cam 31 and the rod 28, the annular groove 34 communicates with both the paths 38 and 39. The flow path between the annular groove 34 and the path 38 communicating with the tank 8 is made narrower by the displacement to the right of the spool valve 26, raising the pressure at the right of the annular groove 34. When this pressure exceeds the pressure at the side of the feeding path 4, part of the hydraulic fluid introduced from the second pump 24 to the inside of the annular groove 34 flows in the feeding path 4 through the path 39 and the check valve 41 to meet with the hydraulic fluid from the first pump 1, and is fed to the power steering device 6 (FIG. 2). When the steering angle of the steering wheel 23 becomes still larger, and the displacement to the right of the spool valve 26 becomes larger, the communication between the annular groove 34 and the path 38 is blocked. Under this condition, all of the hydraulic fluid from the second pump 24 is fed to the power steering device 6.

In this manner, when the steering angle of the steering wheel 23 exceeds the small angle described above, the feeding rate of the hydraulic fluid to the power steering device increases, even though the delivery rates of the pumps 1 and 24 are constant. In FIG. 3, when the rotational frequency of the pumps is (b), the first pump 1 has a delivery rate of (c), and the second pump 24 has a delivery rate of (d). When the steering angle is small and the hydraulic fluid is fed to the power steering device 6 from only the first pump 1, the feeding rate of the hydraulic fluid to the power steering device 6 is (c). However, when the steering angle increases under this condition, the hydraulic fluid from the second pump 24 is fed to the power steering device 6 to increase the overall feeding rate. All the delivered fluid from the second pump 2 is finally fed to the power steering device 6, and the total combined feeding rate becomes (e). When the pump rotational frequency increases and the total feeding rate becomes the predetermined value (a) described above, the flow rate control valve 10 operates so that the feeding rate is kept substantially constant (the characteristic curve (B) of FIG. 3). When the steering angle is intermediate or above, the vehicle is, in general, travelling at a low speed, that is, the delivery rates of the pumps 1 and 24 are small. Under such condition, a large load acts on the power steering device 6, and the vehicle requires a relatively high feeding rate of the hydraulic fluid. Thus, the increase in the feeding rate of the hydraulic fluid is capable of responding to this condition.

Figure 4:
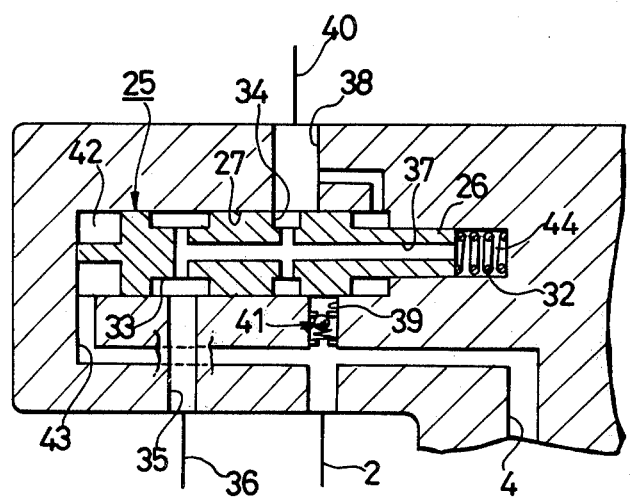
FIG. 4 is a sectional view of the main part of another embodiment of the present invention.

FIG. 4 shows another embodiment of the present invention. In this embodiment, the rod 28, a spring 29, and the cam 31 are eliminated and the spool valve 26 is controlled to advance or withdraw by the delivery pressure of the first pump 1. The construction of the other parts is the same as that of the former embodiment.

In accordance with the construction of this embodiment, the spool valve 26 is not operated according to the steering angle. However, the load exerted on the power steering device 6 becomes greater as the steering angle increases. Accordingly, the delivery pressure of the first pump 1 increases to increase the displacement to the right of the spool valve 26, providing substantially the same effects as the former embodiment.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A hydraulic system, comprising: a power steering device; a steering wheel for operating said power steering device; a plurality of pumps for individually delivering separate flows of pressurized hydraulic fluid; a shiftable, flow path changeover valve having separate inlets for receiving separate flows of pressurized hydraulic fluid from the respective pumps, said change-over valve having outlet means connected to said power steering device and being shiftable for switching the flow paths of the pressurized hydraulic fluid delivered by said pumps whereby to feed the pressurized hydraulic fluid from said pumps to said power steering device, said change-over valve including first actuating means responsive to the magnitude of a load exerted on said power steering device for shifting said change-over valve between a first position in which the pressurized hydraulic fluid is supplied from all of said pumps to said power steering device when said load is great and a second position in which the pressurized hydraulic fluid is supplied from at least one of said pumps when said load is small.

2. A hydraulic system as claimed in claim 1 in which said first actuating means comprises means responsive to the pressure of the hydraulic fluid delivered to said power steering device by one of said pumps.

3. A hydraulic system as claimed in claim 1 in which said change-over valve includes second actuating means responsive to the movement of said steering wheel through a large steering angle for positioning said flow path change-over valve in said first position.

4. A hydraulic system as claimed in claim 3 in which said power steering device has an output shaft responsive to the movement of said steering wheel, a cam mounted on said output shaft, said second actuating means engaging said cam so as to be moved in response to rotation of said cam.

5. A hydraulic system as claimed in claim 1 in which said first actuating means comprises means operable in response to an increase of the pressure of said hydraulic fluid caused by operation of said power steering device so that the hydraulic fluid is supplied from all of said pumps to said power steering device when the pressure of slaid hydraulic fluid is high.

6. A hydraulic system as claimed in claim 1, claim 2, claim 3, claim 4 or claim 5 including a flow rate control valve connected between said change-over valve and said power steering device for limiting the maximum flow rate of hydraulic fluid to said power steering device.

7. A hydraulic system as claimed in claim 1, claim 2, claim 3, claim 4 or claim 5 in which an orifice of restricted size is connected between said change-over valve and said power steering device and including a flow rate control valve connected so as to be opened when the difference of the pressures of the hydraulic fluid on opposite sides of said orifice exceeds a predetermined value whereby to limit the maximum flow rate of hydraulic fluid to said power steering device.

8. A hydraulic system, comprising: a power steering device having a rotatable output shaft; a cam mounted on said output shaft for rotation therewith; a plurality of pumps for individually delivering separate flows of pressurized hydraulic fluid; a shiftable, flow path change-over valve having separate inlets for receiving separate flows of pressurized hydraulic fluid from the respective pumps, said change-over valve having outlet means connected to said power steering device and being shiftable for switching the flow paths of the pressurized hydraulic fluid delivered by said pumps whereby to feed the pressurized hydraulic fluid from said pumps to said power steering device, said change-over valve including first actuating means operable by said cam for shifting said change-over valve between a first position in which the pressurized hydraulic fluid is supplied from all of said pumps when said shaft has been rotated through a large angle and a second position in which the pressurized hydraulic fluid is supplied from at least one of said pumps when said shaft has not been rotated or has been rotated through a small angle.

9. A hydraulic system, comprising: a power steering device; a steering wheel for operating said power steering device; a reservoir for hydraulic fluid; first and second pumps each having an inlet and an outlet, said inlets being connected to said reservoir, said pumps being adapted for individually delivering pressurized hydraulic fluid through their respective outlets; a shiftable, flow path change-over valve having a first inlet connected to the outlet of said first pump and having a second inlet connected to the outlet of said second pump, said changeover value having a first passageway connected at one end thereof to said first inlet and the other end of said first passageway being connected to said power steering device, an orifice of restricted size in said first passageway between said ends thereof, said change-over value having an elongated bore therein and a valve spool slidably disposed in said bore for movement between first and second positions therein, a first lateral port opening into said bore and connected to said second inlet, a second lateral port extending from said bore and connected to said one end of said first passageway, a check valve in said second port for permitting flow of hydraulic fluid from said bore into said first passageway and preventing flow of hydraulic fluid in the reverse direction, a third lateral port extending from said bore and connected to said reservoir for discharging hydraulic fluid into said reservoir, a second passageway extending from said one end of said first passageway to one longitudinal end of said bore, said valve spool having an elongated first groove in the periphery thereof and continuously communicating with said first lateral port in both of said positions of said valve spool within said bore, said valve spool having a second groove in the periphery thereof and adapted to communicate with said second lateral port when said valve spool is in said second position and being blocked from communication with said second lateral port when said valve spool is in said first position, said valve spool having a third groove in the periphery thereof and adapted to communicate with said third lateral port when said valve spool is in said first position and to be at least partially blocked from communication with said third lateral port when said valve spool is in said second position, said valve spool having a third internal passageway extending from said first groove and communicating with said second and third grooves so that all of the hydraulic fluid supplied from said second pump flows to said reservoir when said valve spool is in said first position and at least a portion of said hydraulic fluid supplied from said second pump flows into said one end of said first passageway when said valve spool is in said second position, said valve spool being shifted from said first position to said second position in response to an increase of hydraulic pressure in said first passageway which is applied to said one longitudinal end of said bore via said second passageway.

10. A hydraulic system as claimed in claim 9 in which said power steering device has a rotatable output shaft, a cam mounted on said shaft for rotation therewith, and a movable actuating rod engaged with said cam and extending into said bore and engaging said valve spool for shifting said valve spool from said first to said second position in response to rotation of said shaft through a large angle.

11. A hydraulic system as claimed in claim 10 including a flow rate control valve connected in parallel with said orifice and adapted to be opened when the difference of the pressures upstream of said orifice and downstream of said orifice exceeds a predetermined value whereby to limit the maximum flow rate of the hydraulic fluid to said power steering device.

* * * * *

UNITED STATES PATENT AND TRADEMARK OFFICE
CERTIFICATE OF CORRECTION

PATENT NO.  :  4 400 938
DATED       :  August 30, 1983
INVENTOR(S) :  Takeshi Ohe It is certified that error appears in the above-identified patent and that said Letters Patent is hereby corrected as shown below:

Column 6, Line 16; change "slaid" to ---said---.
Column 6, Line 63; change "value" to ---valve---.
Column 6, Line 68; change "value" to ---valve---.

Signed and Sealed this

Twenty-second Day of November 1983

[SEAL]

Attest:

GERALD J. MOSSINGHOFF

Attesting Officer    Commissioner of Patents and Trademarks